Sept. 18, 1951  G. V. NOLDE  2,568,559
CONTROL MECHANISM FOR COMPASSES AND CALIPERS
Filed Feb. 24, 1945  4 Sheets-Sheet 1

INVENTOR.
George V. Nolde
BY

Sept. 18, 1951 G. V. NOLDE 2,568,559
CONTROL MECHANISM FOR COMPASSES AND CALIPERS
Filed Feb. 28, 1945 4 Sheets-Sheet 3

INVENTOR.
George V. Nolde
BY

Patented Sept. 18, 1951

2,568,559

UNITED STATES PATENT OFFICE 2,568,559

CONTROL MECHANISM FOR COMPASSES AND CALIPERS

George V. Nolde, Berkeley, Calif.

Application February 24, 1945, Serial No. 579,656

7 Claims. (Cl. 33—154)

This invention is directed towards improvement of the mechanisms employed for adjustment of the opening of the compasses, calipers, angle measuring instruments and like implements and its main object is to provide a specifically convenient mechanism operable for the rough and fine adjustment and reading of the angle and distance between two legs of a caliper, compass, or the like instruments. Other specific advantages of this mechanism are best understood from the following specification and drawings.

In Figure 1 a side plate 20 (Figures 2 and 3) is removed to show the general arrangement of the mechanism.

Figures 6 to 11, inclusive, illustrate another embodiment of the same type of mechanism as shown in Figures 1 to 5.

In both embodiments there are used some parts which are identical in function with each other, although having slightly different shape. Such equivalent parts are designated in Figures 6 to 11 by adding a numeral "1" in front of the number designating the equivalent part in Figures 1 to 5. For example in Figures 4, 5, 1, 2, and 3, there are shown tooth racks 23 and 23a. The tooth rack serving the identical functions are designated by 123 and 123a in Figures 6 to 11. The compass legs 22 and 22a (Figs. 4, 5, 2) are denoted by 122 and 122a on Figures 10 and 11. The same is true with respect to the leaf springs 26 (Figures 4, 5) and 126 (Figures 10, 11), and with many other parts referred to in the below presented description.

General operation of the instrument

Arrangement of the mechanism as well as the general mode of operation aimed at in this invention may be understood by referring to the first one of its above mentioned two embodiments as follows:

The compass leg 22a (Figs. 4 and 5) has a tooth rack 23a fastened to it at 24a, and another compass leg 22 has a tooth rack 23 fastened to it at 24. Each rack passes through an opening in the opposite leg so that the rack 23a passes through the opening 25 (Figs. 2 and 5) in the leg 22 and the rack 23 through the opening 25a (Fig. 2) in the leg 22a. The legs 22 and 22a are held together by a leaf spring 26 (Figs. 4 and 5) which presses with its ends upon the upper ends of the legs on the line slightly higher than the center of the pivot shaft 27. These latter parts (26 and 27) cooperate in the well known manner in the art to urge the opening of the legs 22 and 22a.

The legs 22 and 22a in the herein presented preferred embodiment are restrained from opening by a mechanism contained between the plates 20 and 21 (Figs. 4, 1, 2, and 3). The user of such compass or caliper may increase the angle of opening of the legs 22 and 22a either by rotation of the thumb wheel 28 which produces fine adjustment or by lifting upward the knobs 29, 30 (Figs. 4 and 5), which latter operation totally removes the above mentioned restraining action of the mechanism contained between the plates 20, 21 and thus permits the increase of the angle between the legs 22a and 22 to any desired amount.

To decrease the angle of opening between the legs 22 and 22a the user may merely pull the ends of these legs towards each other (against the force supplied by the leaf spring 26), or if fine adjustment is desired the user may rotate the thumb wheel 28. If desired these rough and fine adjustments may be performed one after another or each adjustment may be repeated several times, and in general any sequence of fine and rough adjustments may be used.

Thus the instrument with its legs in any position may be adjusted for increase or decrease of the angle between its legs by either fine movement by rotating the wheel 28 or by rough movement by simply pulling the legs together or permitting them to spread apart under the influence of the spring 26, upon lifting of the knobs 29 and 30.

The mechanism contained between the plates 20 and 21 is so designed that under any manner of operation the thumb wheel 28 is always automatically maintained at exactly equal distance from each leg 22a and 22 irrespectively of the angle between them. That is to say the center line passing through the axis of the stud 33 always passes through the center plane of the wheel 28 and this center line always bisects exactly in half the angle of opening between the legs 22 and 22a.

This feature makes it specifically convenient to make adjustment of the angle between the legs 22 and 22a with one hand only; the user would hold the instrument at the pivot 27 between the thumb and index finger while using the middle finger for rotating the wheel 28 or lifting the knobs 29, 30 for rough adjustment.

Either fine or rough adjustment is available in this type of mechanism for any position of the legs 22 and 22a and no resetting or presetting of any parts is required at any time.

Details of the first embodiment

Figure 2:
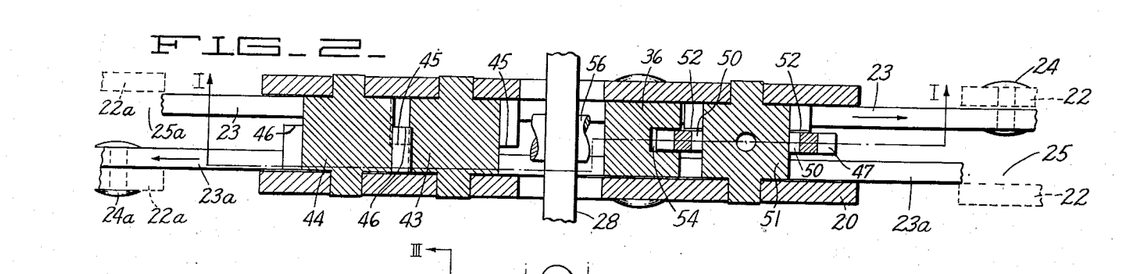
Figure 2 shows an enlarged top view of a section of the mechanism taken on the line II—II of the Figure 1.
Figure 3:
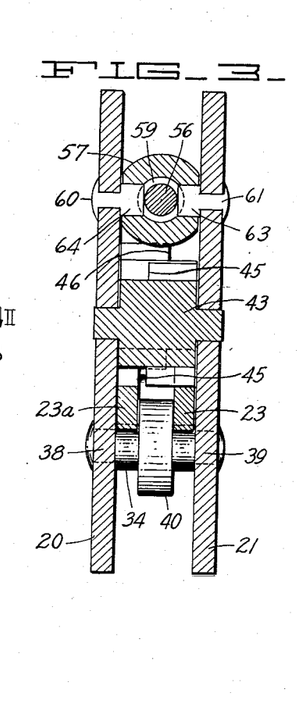
Figure 3 shows an enlarged sectional view of the mechanism taken on line III—III of Figure 1.

The plates 20 and 21 are fastened together at a certain distance by use of spacers 34, 35, 36 and 37 (Figs. 1, 2, and 3) of which the spacers 36 and 37 have holes through which their corresponding rivets are passed, whereas the spacers 34 and 35 have themselves the tenons 38, 39 of which the ends form the rivet heads as shown on Figure 3.

The racks 23 and 23a are guided between the plates 21 and 20 and protrusions 40 and 41 of the spacers 34 and 35 respectively. The lower edge of the spacer 36 forms the upper guiding surface for both racks 23a and 23. When the compass legs 22 and 22a (Fig. 4) are moved to increase the angle between each other, the rack 23 (Fig. 1) moves in the direction indicated by the arrow 42 and the rack 23a moves in the direction shown by the arrow 42a.

Between thus spaced plates 20 and 21 there are located two gear trains, namely one consisting of the gears 43 and 44 (Figs. 1 and 2) and another consisting of the screw gear 47, ratchet 48, 50 and gear 51. These two gear trains serve two independent functions and will be described separately.

The tooth wheels 43 and 44 (Figs. 1, 2 and 3) provide the specially functioning support for the mechanism located between the plates 20 and 21. These gears 43 and 44 are pivoted for rotation between said plates 20 and 21 and are in mesh with one another and with racks 23 and 23a in a particular manner. The gear 43 has the teeth extended only over the part of its width; namely, the edges 45 (Figs. 2 and 3) of each tooth on the gear 43 do not touch the rack 23a. The edges 46 of the gear 44 likewise are located to provide a clearance between themselves and the rack 23. The teeth of the gears 43 and 44; however, are wide enough to provide meshing between these gears. Thus the gear train between the racks 23 and 23a consists of the gear 43 in mesh with the rack 23 and with the gear 44, while the latter gear 44 is in mesh with the rack 23a.

Figure 1:
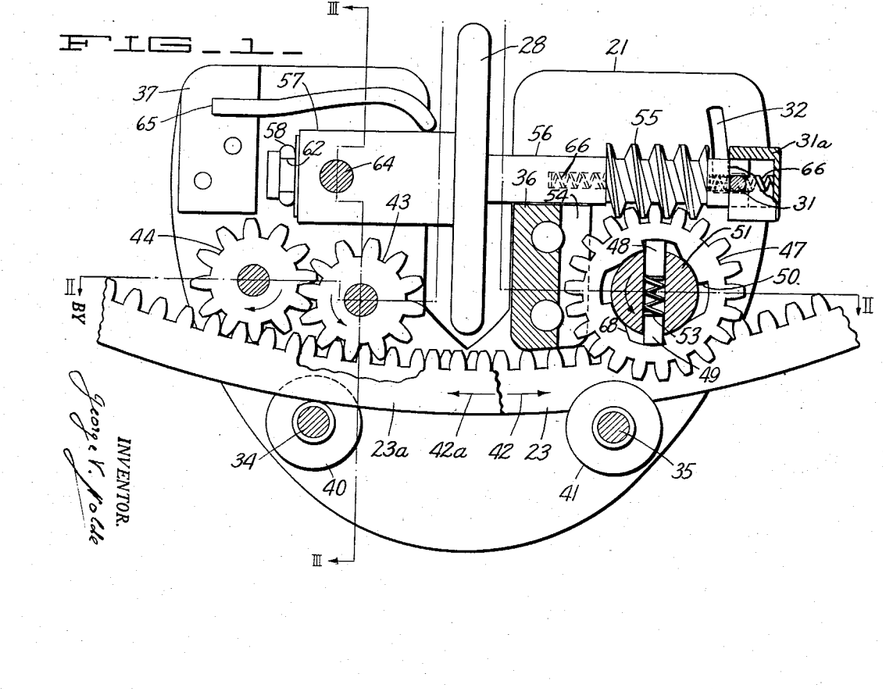
Figure 1 of the drawings presents an enlarged side view of one of the preferred forms of the mechanism.

Such arrangement of the gears 43 and 44, together with the spacers 34, 35 and 36, provides the support for the plates 20 and 21 which support does not allow the movement of the plates 20 and 21 along the racks 23 and 23a. Upon the attempt to pull thus mounted racks 23 and 23a, for example, leftward, both gears tend to roll over their respective racks in counterclockwise direction, whereas due to their meshing with each other they are prevented from that rolling, thus retaining the plates motionless.

Pulling of one rack, for example, the rack 23 relative to the plates 20, 21 in the direction of the arrow 42 rotates the gear 43 counterclockwise whereby the gear 44 is rotated clockwise and moves the rack 23a in the direction of the arrow 42a by exactly the same amount relative to the plates 20, 21 as the rack 23 is pulled but in the opposite direction. In general by imparting to one of the racks the movement in one direction relative to the plates 20, 21 the other rack is moved equal amount in the opposite direction due to the above described action of the gear train 43, 44. Since at the same time the gear train 43, 44 prevents movement of the plates 20, 21 relative to both racks 23, 23a in any direction, the plates 20, 21 are always held exactly in the center of the angle formed by the legs 22 and 22a.

The second gear train 47, 48, 50 and 51 located between the plates 20 and 21 operates for imparting the controlled amount of motion to the rack 23 relative to the plates 20 and 21.

In this train the gear 51 (Figs. 1 and 2) has the teeth extended over a part of its width so that the tooth edges 52 (Fig. 2) on this gear just overlap the width of the rack 23. In the hub of the gear 51 there is bored a hole and two pins 48 and 49 (Fig. 1) are slidably located in that hole with a compression spring 53 tending to spread apart these two pins.

Over these two pins is mounted a gear 47 which has ratchet teeth recesses 50 cut out from its bearing surface. The gear 47 is retained at equal distances from the plates 20 and 21 by the slot 54 in the spacer 36.

The tooth wheel 47 forms a worm gear with the worm 55 which is integral with the shaft 56 and wheel 28. The lead angle of the worm 55 is made small enough so that the worm gear 55, 47 is rendered irreversible, that is to say while the worm 55 can turn the wheel 47 in any direction, the application of a torque to the wheel 47 cannot produce motion of the wheel 47 and the worm 55.

The shaft 56 is journaled in the bushing 57 in which it is retained during assembly by the ring 58 placed in the groove 62 at the end of the shaft. Besides the groove 62 (Fig. 1) the shaft 56 has a second groove 59 (Fig. 3) which is located opposite the holes 63 and 64 in the bushing. The pins 60 and 61 (Fig. 3) retain the entire assembly 55, 56, 28 and 57 in fixed relationship with plates 20 and 21.

The shaft 56 can be rocked around the pivot center coincident with the axis of the pins 60 and 61 and is urged clockwise into position shown in Figure 1 by the leaf spring 65 affixed in the spacer 37. The shaft 56 is retained in the worm gear engagement position by the shaft 31 (Fig. 1) on the ends of which shaft the knobs 29 and 30 (Figs. 4 and 5) are located. The shaft 31 may be moved in the L-shaped slots 32 (Figs. 1 and 4) made in the plates 20 and 21. The shaft 31 in its middle is enlarged to assume the shape of a round cap 31a surrounding the end of the shaft 56 (Fig. 1). This cap 31a may slide freely between the plates 20 and 21 on the end of the shaft 56. In the shaft 56 there is bored an axially located channel in which channel there is placed a spring 66 and this spring abuts the inner side of the cap 31a urging, thus, the assembly 31a, 31, 29 and 30 rightward (as seen on Figs. 1 and 4). By moving the shaft 31 leftward and up in the L-shaped slots 32 by means of knobs 29 and 30 the worm 55 is disengaged from the wheel 47.

It may be noted that the shaft 31 with the knobs 29 and 30, as well as the spring 66, may be removed at the option of the user whereby the spring 65 alone would hold the shaft 56 in the position of engagement of the worm gear 55, 47. In such a case to disengage the worm 55 from the wheels 47, the wheel 28 should be pulled upward (instead of moving the knobs 29, 30 leftward and up).

Since the spring 26 (Figs. 4 and 5) produces the force tending to move the rack 23 in the direction of the arrow 42 (Fig. 1) the gear 51 is urged to rotate in counterclockwise direction and is restrained from doing so by the abutment of the pins 48 and 49 against the edges of the recesses 50 in the bearing surface of the wheel 47. Rotating manually the wheel 28 to allow the gear 47 to rotate counterclockwise produces gradual increase of the angle between the compass legs 22 and 22a. Lifting the worm 55 away from the wheel 47 allows the unrestrained counterclockwise rotation of both gears 51 and 47 and thus produces instantaneous opening of the compass legs 22 and 22a to the abutment of the leg 22 with the pin 67a (Figs. 4 and 5) and of the leg 22a with the pin 67, which pins are affixed at the ends of their corresponding racks 23a and 23.

Rotating the wheel 28 to produce the clockwise movement of the worm wheel 47 produces rotation (also clockwise) of the gear 51 due to abutment of the edges of the recesses 50 with pins 48 and 49. This clockwise rotation of the gear 51 moves the rack 23 realtively to the plates 20 and 21, in the direction opposite to the arrow 42. This moves the rack 23a (due to the gear train 43, 44) in the opposite direction, thus decreasing gradually the angle between the compass legs 22 and 22a. If these legs 22 and 22a are manually pulled together, this produces clockwise motion of the gear 51, but since the worm wheel 47 is restrained from rotation by the worm 55, the pins 48 and 49 are cammed down by the inclined edges 68 of the recesses 50 at the bearing surface of the wheel 47.

It must be noted that the edges opposite to the edges 68 in the recesses 50 are cut on straight radial direction, thus providing abutment for the pins 48 and 49; while the edges 68 do not provide abutment for the pins 48 and 49 but on the contrary cam them down in passage, thus allowing "override" of the gear 51 relatively to the gear 47 in clockwise direction.

It may be noted that the subassembly consisting of the parts 51, 48, 49 and 47 represent an "overriding" unidirectional clutch and as such may be replaced with any equivalent structure of such clutches known in the art. Wedged rollers or ball and spring devices for example may be used instead of the above described and shown on the drawing preferred structure of the ratchet clutch type.

It may be further noted, that unidirectional action of said clutch whereby "overrunning" is permitted only in one direction (clockwise rotation of the hub 51 relative to the wheel 47) may be replaced, if desired, by the overriding action in both directions. The pins 48 and 49 in such a case would have conical ends, both edges of the recesses 50 in the wheel 47 would then have the same incline as the edges 68, whereas the compression spring 53 in such a case would have to be made much stiffer so as to provide detent action between the pins 48, 49 and the wheel 47.

If such a modification should be chosen, then the clutch means 48, 49, 68, 47 would permit upon application of a large enough force to the legs 22 and 22a to pull them together as well as spread them apart without disengaging the worm 55 from the worm wheel 47. If the subassembly 51, 48, 49, 47 would be modified in the above mentioned way, however, there would occur greater wear of parts and also greater forces would be needed for initiation of "rough adjustment" of the opening of the instrument.

On the wheel 28 there may be put divisions and figures to indicate the amount of angular opening produced by the rotation of the wheel 28.

Figure 4:
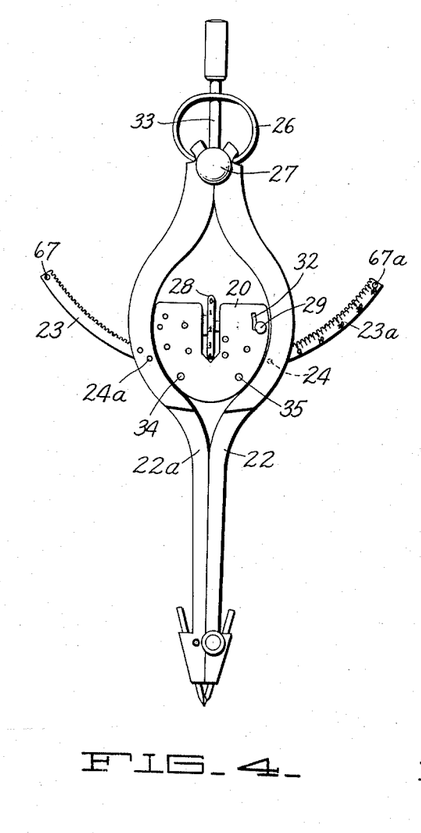
Figure 4 shows a side elevation of a drawing compass or a caliper in which the opening is controlled by the mechanism shown in sections on Figures 1, 2 and 3.
Figure 5:
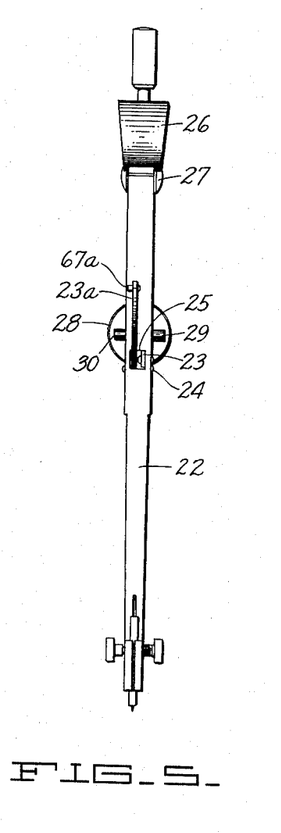
Figure 5 shows another side view of the instrument shown in Figure 4.

For illustration of how the angular values may be read on the instrument some numerical dimensions of an instrument such as illustrated in Figures 4 and 5 may be given. It is to be understood, however, that such dimensions are given for illustration by way of example only and are not intended to limit the scope of the invention, as proper dimensioning or shape of members would be well within the scope of work of those skillful in the art and desiring to follow the teachings herein presented.

Suppose that the distance from the center of the pivot 27 (Figs. 4 and 5) to the pitch line of the teeth of the racks 23, 23a is 1.9285 inches. The diametral pitch of the teeth on the racks 23, 23a and the wheels 43, 44, and 51 being about 56, these wheels having twelve teeth each. Suppose also that the wheel 47 has 20 teeth with diametral pitch being about 64. It may be further noted that arcuate racks 23 and 23a if continued around the center of the pivot 27 (with above given pitch radius of 1.9285" and teeth of 56 diametral pitch) would form a ring gear having 216 teeth for 360° periphery.

One revolution of the wheel 28 (Figs. 4 and 5) in this case would advance the worm wheel 47 (Fig. 1) and consequently the wheel 51 (Fig. 2) by exactly 1/20 of the revolution and the rack 23 will be moved (relative to the center line through centers of the pivot 27 and the wheel 28) by $$\frac{1}{20} \times \frac{12}{216} = \frac{1}{360}$$

of the revolution or by exactly one degree. This motion will be repeated in the opposite direction by the rack 23a, thus producing the change of angle between the legs 22 and 22a equal to exactly two degrees. With 120 divisions placed on the periphery of the wheel 28 turning of that wheel one division past an index pointer (not shown on the drawing) will produce the change of the angle between the legs 22 and 22a equal to exactly one minute.

To establish any desired angle between the legs 22 and 22a they first are moved to one of the "ten degrees" divisions placed on the rack 23a (Fig. 4) in above explained "rough adjustment" manner, keeping the above mentioned index pointer for the wheel 28 against "zero" division on the periphery of the wheel 28. Then each revolution of the wheel 28 will be indicated by the "two degrees" division on the rack 23a (Fig. 4) and the intermediate values would be read from the periphery of the wheel 28. It may be noted that with four recesses 50 (Fig. 1) in the wheel 47 the "rough adjustment" steps will correspond to the rotation of the wheel 47 by ¼ of revolution or to 10° of angular change between the legs 22 and 22a.

Upon analysis of the above-described invention it may be noted that the mechanism supported between the plates 20 and 21 would function for providing rough and fine adjustment of distance between the middle parts of the legs 22 and 22a (Fig. 4) if the gear 43 (Fig. 1) would be removed initially and the wheel 44 would be clamped to the plates 20, 21 to provide hooking action upon the rack 23a. The wheel 43 meshed as above described may be considered as a specific means of affixing the support plates 20, 21 to the leg 22a via the rack 23a and the wheel 44. Whereas the worm gear 55, 47 and the wheel 51 may be considered as an adjustment mechanism proper for pulling the rack 23 towards the leg 22a or allowing it to be pulled away by the action of the leaf spring 26.

Many valuable modifications of this structure may be arrived at through similar to the above given observations upon the principle of this invention. One of such modifications is presented immediately hereinafter as a second embodiment of this invention to indicate the way for further improvements of such instruments.

Details of the second embodiment

In the second embodiment of this invention as illustrated by Figures 6 to 11 the parts are modified to allow for a more convenient shape of the instrument, smaller quantity of components (yet achieving the same general mode of operation as in the first embodiment). And finally the second embodiment provides for a better convenience of reading of the approximate linear distance between the points of the legs 122 and 122a (Figs. 10 and 11) rather than the angular position thereof as provided in the previously described embodiment.

Figure 10:
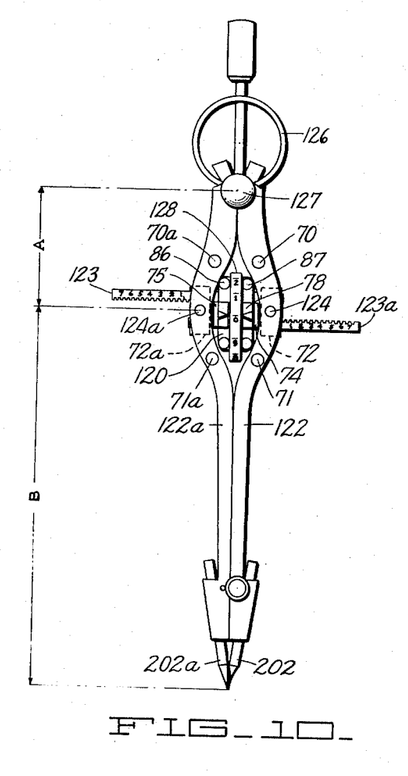
Figure 10 shows a side view of a compass whose adjustment is performed by mechanism shown in Figures 6 to 9 in the large scale.
Figure 11:
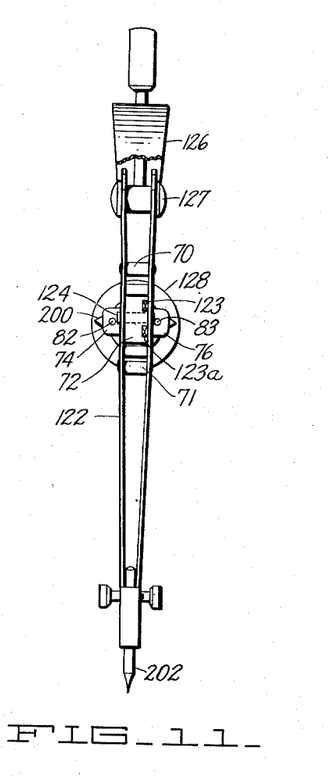
Figure 11 shows another side view of the instrument shown in Figure 10.

In the below described second embodiment the legs 122a and 122 (Figs. 10 and 11) of our compass are made each of two punched out of sheet metal parts as seen in Fig. 11 spaced and riveted together by the rivet spacers 70, 71 and 70a and 71a as shown on the drawing. The legs 122, 122a are pivoted at 127 and are urged apart by the leaf spring 126 in the manner well known in the art and similar to that shown in the previously described embodiment.

Between the spacers 70, 71 in each leg there are pivoted on the pivots 124 and 124a (Figs. 10, 11 and 9) the blocks 72 and 72a. To the block 72 there is fastened the tooth rack 123 and to the block 72a there is fastened the tooth rack 123a. The free end of the rack 123 slides in the upper recess of the block 72a and the free end of the rack 123a slides in the lower recess of the block 72 (Figs. 10, 11 and 9).

Between these two racks 123 and 123a there is placed in mesh with them both a pinion 73 (Figs. 6 and 9) which has a hub 151 in which pins 148 and 149 are placed. Over these pins is placed the worm wheel 147, the latter having recesses 150 (Fig. 6) around its bearing surface. These recesses 150 are similar to those designated by the numeral 50 on Fig. 1 and form, together with the pins 148 and 149, the unidirectional overriding clutch unit permitting the hub 151 to rotate freely inside of the wheel 147 in counterclockwise direction and restraining the hub 151 to rotate separately from the wheel 147 if the hub 151 is urged by the racks 123, 123a to rotate clockwise.

Figures 6, 7, 8, 9:
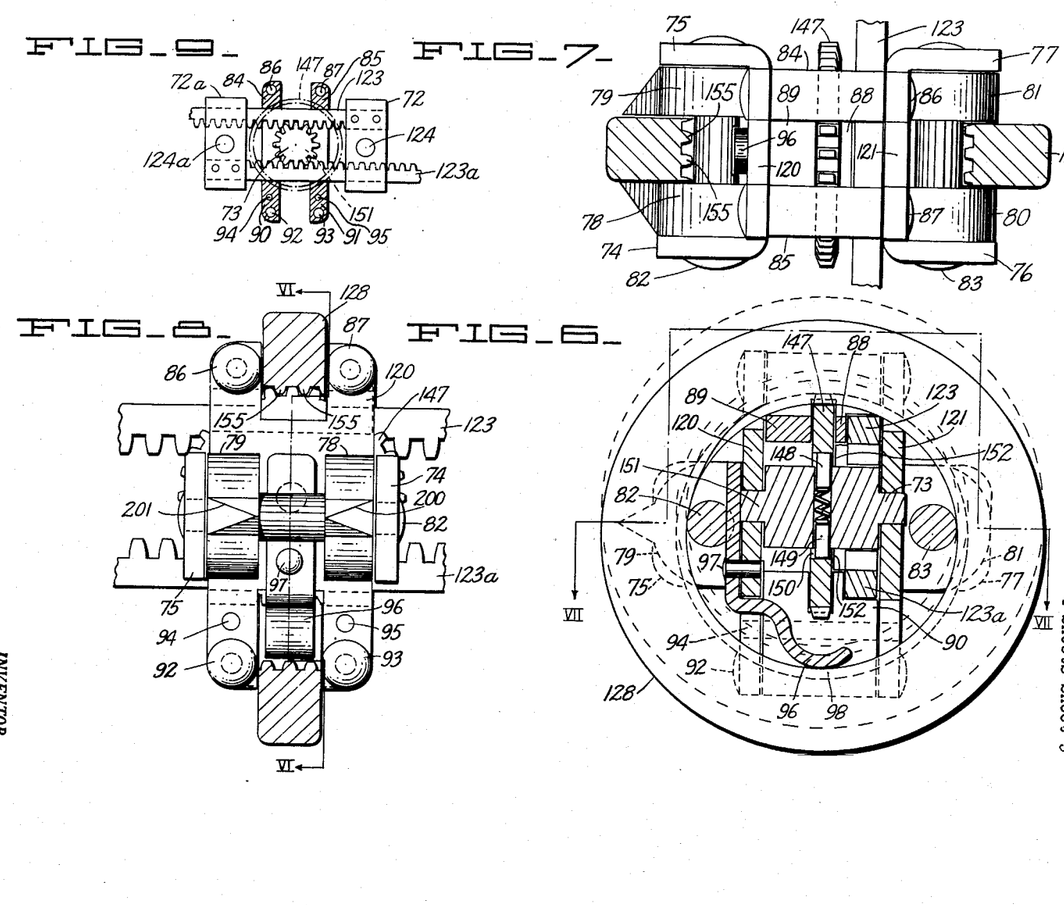
Figure 6 shows a section along the lines VI—VI of Figure 8.
Figure 7 shows a top view of the parts illustrated by Figure 6 with partial section along the line VII—VII in Figure 6.
Figure 8 shows the side view of the parts shown on Figure 6 with certain parts broken away.
Figure 9 shows a side view similar to that shown on Figure 8 but with some more parts removed and broken away for clarity of the view.

The clockwise and counterclockwise directions are to be considered looking at Figs. 8, 9 and 10.

The edges 152 of the teeth protruding from the hub 151 (which teeth form the pinion 73) overlap the width of the racks 123 and 123a as seen in Fig. 6 and these edges abut the wheel 147 on one side.

The pinion 73 in this embodiment together with its hub 151 performs the function of both gear trains 43, 44 as well as 51 of the previously described embodiment, namely:

The pivots 124 and 124a are placed at the same distance from the pivot 127; therefore upon opening or closing of the compass legs 122a and 122 the movement of each rack 123 and 123a being opposite in direction is equal in amount. Due to this fact the pinion 73—151 remains always in the position exactly midway between the two legs 122a and 122, thus serving the purpose, which in the mechanism illustrated by Figs. 1, 2 and 3 is served by the pinions 43 and 44. At the same time rotation of the pinion 73—151 (produced by rotating the wheel 147 due to the action of the hereinafter described means) results in the action identical to that produced by the rotation of the gear 51 in Fig. 1, as previously described.

The pinion 73 (with the hub 151) is journaled in two plates 120 and 121 (Figs. 6 to 10). The plate 120 has two ears 74 and 75 and the plate 121 has two ears 76 and 77 of the identical shape (Figs. 11, 10, 6, 7 and 8). These ears serve to support spacing blocks 78, 79, 80 and 81 which are located on the round rivet-spacers 82 and 83.

At the upper ends the plates 120 and 121 are spaced apart with a specifically shaped block consisting of two cross bars 84 and 85 and two bars 88 and 89 (Figs. 6 and 7) which run parallel to the racks 123 and 123a. The bars 84 and 85 have the holes through which run the rivets 86 and 87. The lower ends of the plates 120 and 121 are spaced by two separate bars 90 and 91 of which 90 may be seen in Fig. 6, while the bar 91 is in mirror image with the bar 90 relative to the line VI—VI on Fig. 8. The rivet 92 and the dowel pin 94 run through the bar 90 and the rivet 93 and the dowel pin 95 run through the bar 91.

Between the bars 90 and 91 is placed a leaf spring 96 (Figs. 6, 7, 8) riveted to the plate 120 at 97. This leaf spring tends to straighten out and produces a constant force downwards at the point 98 (Fig. 6) when the spring 96 is in the position shown in Figure 6.

The ring 128 has on its inner side the worm screw threads 155 and is supported on the points of the inner periphery of these threads which are seen on Fig. 6. The bearing points for the ring 128 are provided at 98 by the end of the spring 96, by the surface of the rivet 82, by the upper edge of the slot in the plate 120, by the upper edge of the bar 89 of the upper spacer block, by the edge of the rack 123, by the edge of the slot in the plate 121 and by the surface of the rivet 83. If the ring 128 is pulled upward (Figs. 6 and 8) the spring 96 yields and the ring 128 assumes the position shown by the dotted lines on Fig. 6.

In the direction parallel to the racks 123 and 123a the ring 128 is supported by the spacing blocks 78, 79, 80 and 81 (Figs. 7 and 8) and by the side edges of the slots in the plates 120 and 121 as shown. On the outer periphery of the ring 128 there are placed indicia designating angular positions of the ring. These indicia are pointed off by the triangular shaped protrusions 200 and 201 (Fig. 8) of the spacing blocks 78 and 79. If desired the same pointers may be also made on the blocks 80 and 81 (Fig. 7).

The screw threads 155 placed upon the inner periphery of the ring 128 are normally in mesh with the worm-wheel 147 with which it forms a worm gear. Rotating the ring 128 changes the distance between the legs 122 and 122a in fine steps similar to the action of the wheel 28 and worm gear 55—47 (Fig. 1) as described hereinbefore with reference to the first embodiment. Pulling up of the ring 128 into position shown by the dotted lines (Fig. 6) disengages the worm threads 155 from the worm wheel 147 and permits the legs 122 and 122a to open up under the influence of the leaf spring 126 (Fig. 10).

By pulling the legs 122 and 122a together there is brought into action the overrunning clutch composed of the pins 148, 149 and recesses 150 (Fig. 6) in the worm wheel 147, so that while the wheel 147 remains stationary the gear 73 with its hub 151 is rotated counterclockwise between the racks 123 and 123a, thus allowing the rough adjustment of the compass legs opening.

It may be noted that the indicia placed upon the racks 123, 124 and the wheel 128 actually may represent with full precision only the distance between the pivots 124 and 124a (Fig. 10). If, however, we allow a small error in reading, these indicia may be made to represent with close approximation the distance between the points of the end rods 202 and 202a on the legs 122 and 122a. The error is due to the fact that it is desirable that the points of the rods 202 and 202a should be initially placed in contact with each other (as shown on Fig. 10), whereas the centers of the pivots 124 and 124a are initially spread apart due to the necessity of placing the above described motion-controlling mechanism with the wheel 128 between these pivots. It may be seen by examining the geometry of this structure that full precision of reading would be attained only in case the point of the rod 202 would be bent out so as to have its tip always located on the prolongation of a center line connecting the centers of the pivots 124 and 127 and the point 202a would be bent to be placed on the prolongation of a center line connecting the centers of the pivots 124a and 127.

The error of reading, however, with the following choice of proportions of the instrument is not great and the instrument of this type may be recommended for drafting use whereas for the caliper work there may be used auxiliary end rods 202 and 202a with points bent out to achieve the above explained condition.

If the distance "A" (Fig. 10) is made to be 1.1875 inches and the distance "B" is made to be 3.5 inches then motion of each rack by 0.0127" in opposite directions will spread the points 202 and 202a apart from each other by 0.1000" (or rather very closely so). The movement of each rack by 0.0127" relative to the axis of the wheel 73—151 may be achieved by making the worm wheel 147 with 53 teeth and the pinion 73 with 12 teeth 56 pitch of 0.2142 pitch diameter. With these dimensions one revolution of the wheel 128 would produce movement of the 1/53 of the pitch diameter periphery of the gear 73—151 thus advancing each rack by $$\frac{1}{53} \times 0.2142 \times 3.14 = 0.0127''$$

It may be noted that some modifications readily comprehended by those skilled in the art may be easily introduced in the structure of this second embodiment of the instrument of this nature.

To increase rigidity of support of the plates 120 and 121 there may be fastened to each block 72 and 72a (Figs. 10, 11 and 9) an additional bar whose cross section and length would be identical with the racks 123 and 123a as seen in Fig. 6. These additional bars would run parallel with the racks 123 and 123a (Fig. 6) and the cross sections of such additional bars would appear on Fig. 6 in mirror image with the racks 123 and 123a relative to the axis of the pins 148 and 149 as seen in that figure. The bar 89 of the spacer block in such a case would be thinner in cross section and exactly alike to the bar 88, whereas in the bars 90 and 91 additional recesses would be provided in all identical with the recesses in the block 99 seen in Fig. 6, through which recesses runs the rack 123a.

The leaf spring 96 (Fig. 6) may be replaced by a rigid non-yielding member keeping the ring 128 always in the position shown by solid lines in Fig. 6. Such a rigid member may be slid upward under control of the turning motion from the rivet 82 which may be equipped with two or three pinion teeth engaging the member 96 as a rack (refer to Figs. 6 and 7). Such a modification would provide operation equivalent to the provision of a locking control similar to the knobs 29 in the previously described embodiment.

These and the like modifications would undoubtedly be easily understood by those skilled in the art desiring to follow these teachings.

While the present invention, as to its objects and advantages, has been described herein as carried out in the specific embodiments thereof, it is not desired to be limited thereby but it is intended to cover the invention broadly within the spirit and scope of the appended claims.

I claim:

1. In an instrument of the class described, the combination of, two members mounted for movement relative to each other, and devices for controlling such movement including, a first link connected to one of said members, a second link connected to the other member, and a connection between said two links and effective to drive the two links in opposite directions, a manually operable control wheel mounted for rotation upon an axis parallel to the direction of movement of said two members, a worm fixed to said control wheel and operable thereby to drive said connection, with clutch means between said connection and said worm and effective in one direction of operation to transmit the drive from said worm to said connection and effective in the other direction of operation to permit movement of said connection while the worm remains stationary.

2. In an instrument of the class described, the combination of, two members mounted for movement relative to each other, and devices for controlling such movement including, a first link connected to one of said members, a second link connected to the other member, and a connection between said two links and effective to drive the two links in opposite directions, a manually operable control wheel mounted for rotation upon an axis parallel to the direction of movement of said two members, a worm fixed to said control wheel and operable thereby to drive said connection, spring means for urging said worm into operative engagement with said connection and yieldable by manual pressure against the control wheel to disengage the worm from the connection to permit free movement of said members relative to each other, with clutch means between said connection and said worm and effective in one direction of operation to transmit the drive from said worm to said connection and effective in the other direction of operation to permit movement of said connection while the worm remains stationary.

3. In an instrument of the class described, the combination of, two members mounted for movement relative to each other, and devices for controlling such movement including, a first link connected to one of said members, a second link connected to the other member, and a connection between said two links and effective to drive the two links in opposite directions, a manually operable control wheel mounted for rotation upon an axis parallel to the direction of movement of said two members, a worm fixed to said control wheel and operable thereby to drive said connection, spring means for urging said worm into operative engagement with said connection and yieldable by manual pressure against the control wheel to disengage the worm from the connection, and a second spring means effective upon such disengagement to cause said two members to move away from each other, with clutch means between said connection and said worm and effective in one direction of operation to transmit the drive from said worm to said connection and effective in the other direction of operation to permit movement of said connection while the worm remains stationary.

4. In an instrument of the class described, the combination of, two members mounted for movement relative to each other, and devices for controlling such movement including, a first link connected to one of said members and a second link connected to the other member, gear teeth formed on each of said links, a gear connection between said teeth and effective upon rotation of the gear connection to drive said two members in opposite directions, a worm gear fixed to said gear connection, a manually operable control wheel mounted for rotation upon an axis parallel to the direction of movement of said two members, a worm screw fixed to said control wheel and operable thereby to drive said worm gear, spring means for urging said worm screw into operative engagement with the teeth of said worm gear and yieldable by manual pressure against said control wheel to disengage said worm screw from said worm gear to permit free movement of said members relative to each other, with clutch means between said gear connection and said worm gear and effective in one direction of operation to transmit the drive from the worm gear to the gear connection and effective in the other direction to permit rotation of said connection while said worm gear is stationary.

5. In an instrument of the class described having two legs pivotally mounted at one end of each upon a common center, the combination of devices for controlling movement of the other end of each leg about the common center including, a first link connected to one leg intermediate its ends and a second link connected to the other leg intermediate its ends, gear teeth formed on each of said links and a central control member associated with said two links including a gear connection between said teeth and effective upon rotation of said gear connection to drive the two links and their related legs in opposite directions, a worm gear fixed to said connection and a manually operable control wheel including a worm screw for driving said worm gear, with spring means for urging said worm screw into operative engagement with the teeth of said worm gear and yieldable by manual pressure against said control wheel to disengage the worm screw from the worm gear to permit free movement of said legs relative to each other, and clutch means between said connection and said worm gear and effective in one direction of operation to transmit the drive from the worm gear to the connection and effective in the other direction to permit rotation of the connection while the worm gear is stationary.

6. In an instrument of the class described having two legs pivotally mounted at one end of each upon a common center, the combination of devices for controlling movement of the other end of each leg about the common center including, a first link connected to one leg intermediate its ends and a second link connected to the other leg intermediate its ends, gear teeth formed on each of said links and a central control member associated with said two links including a gear connection between said teeth and effective upon rotation of said gear connection to drive the two links and their related legs in opposite directions, a worm gear fixed to said connection and a manually operable control wheel including a worm screw for driving said worm gear, spring means for urging said worm screw into operative engagement with the teeth of said worm gear and yieldable by manual pressure against said control wheel to disengage the worm screw from the worm gear to permit free movement of said legs relative to each other, and a second spring means effective upon such disengagement to separate said legs, with clutch means between said connection and said worm gear and effective in one direction of operation to transmit the drive from the worm gear to the connection and effective in the other direction to permit rotation of the connection while the worm gear is stationary.

7. In an instrument of the class described, the combination of, two legs pivotally mounted upon a common center, a first toothed rack, a second opposed toothed rack, and a pinion gear enmeshed with the opposed teeth of said two racks, pivot members each comprising a part of a respective one of said two racks and connected to said legs at points equal distances from said common center, said pivotal members being effective upon rotation of said pinion to cause equal amounts of movement of the legs relative to a fixed datum line, a support member carried by said pinion and disposed at mutually equal distances from said two pivotal members, bearings carried by said support member, a control wheel journaled in said bearings for rotation around an axis parallel to the direction of movement of said two pivotal members, and a worm gear carried by said pinion, a worm screw fixed to said control wheel, with a spring means for urging said worm screw into operative engagement with said worm gear and yieldable by manual pressure against said control wheel to disengage said worm screw and worm gear, a second spring means effective upon such disengagement to separate said legs, and clutch means between said pinion and said worm gear and effective in one direction of rotation of the latter to transmit the drive from said worm gear to said pinion and effective in the other direction to permit rotation of the pinion while said worm gear is stationary.

GEORGE V. NOLDE.

(References on following page)

REFERENCES CITED

The following references are of record in the file of this patent:

UNITED STATES PATENTS

| Number | Name | Date |
|---|---|---|
| 21,435 | Moon | Sept. 7, 1858 |
| 64,391 | Whiting | Apr. 30, 1867 |
| 229,777 | Villa | July 6, 1880 |
| 293,647 | Getty et al. | Feb. 19, 1884 |
| 682,294 | Terlin | Sept. 10, 1901 |
| 1,226,337 | Lackner | May 15, 1917 |
| 1,244,390 | Taylor | Oct. 23, 1917 |
| 1,303,747 | Walton | May 13, 1919 |
| 1,330,503 | Thompson | Feb. 10, 1920 |
| 1,396,417 | Gepack | Nov. 8, 1921 |
| 1,398,871 | Livingston | Nov. 29, 1921 |

FOREIGN PATENTS

| Number | Country | Date |
|---|---|---|
| 17,954 | Great Britain | Aug. 13, 1896 |
| 212,218 | Switzerland | Feb. 17, 1941 |